United States Patent
Kim et al.

(10) Patent No.: US 6,741,580 B1
(45) Date of Patent: May 25, 2004

(54) COMMON CHANNEL COMMUNICATION DEVICE AND METHOD SUPPORTING VARIOUS DATA RATES IN A MOBILE COMMUNICATION SYSTEM

(75) Inventors: Dae-Gyun Kim, Seoul (KR); Hyun-Seok Lee, Seoul (KR)

(73) Assignee: Samsung Electronics Co., Ltd. (KR)

(*) Notice: Subject to any disclaimer, the term of this patent is extended or adjusted under 35 U.S.C. 154(b) by 0 days.

(21) Appl. No.: 09/395,535

(22) Filed: Sep. 14, 1999

(30) Foreign Application Priority Data

Sep. 14, 1998 (KR) .............................. 98-38352

(51) Int. Cl.[7] .............................. H04B 7/212
(52) U.S. Cl. .................. 370/337; 370/358; 370/470; 455/515
(58) Field of Search .................. 370/230, 320, 370/330, 342, 358, 335, 331, 385, 337, 344, 347, 432, 468, 478; 455/68–69, 509, 512, 515–517, 62, 442, 455, 452

(56) References Cited

U.S. PATENT DOCUMENTS

| | | | |
|---|---|---|---|
| 5,469,502 A | * 11/1995 | Matsumoto | ............ 379/230 |
| 6,064,663 A | * 5/2000 | Honkasalo et al. | ......... 370/335 |
| 6,088,578 A | * 7/2000 | Manning et al. | ........... 455/509 |
| 6,104,709 A | * 8/2000 | Rinchiuso et al. | .......... 370/432 |
| 6,167,270 A | * 12/2000 | Rezaiifar et al. | ............. 455/62 |
| 6,418,148 B1 | * 7/2002 | Kumar et al. | ............... 370/468 |

* cited by examiner

Primary Examiner—Steven H. D Nguyen
Assistant Examiner—Phuongchau Ba Nguyen
(74) Attorney, Agent, or Firm—Dilworth & Barrese LLP

(57) ABSTRACT

A common channel communication method for a base station in a mobile communication system including common channels, each of which support at least two data rates. The method comprises determining a data rate of the common channel available in a common channel service state and a frame length serviceable at the determined data rate, transmitting a message including information about the determined data rate and frame length on a specific forward common channel before transmission; and upon receipt of an acknowledge message through a specific reverse common channel, setting a data rata and a frame length of the common channel to the determined values.

14 Claims, 17 Drawing Sheets

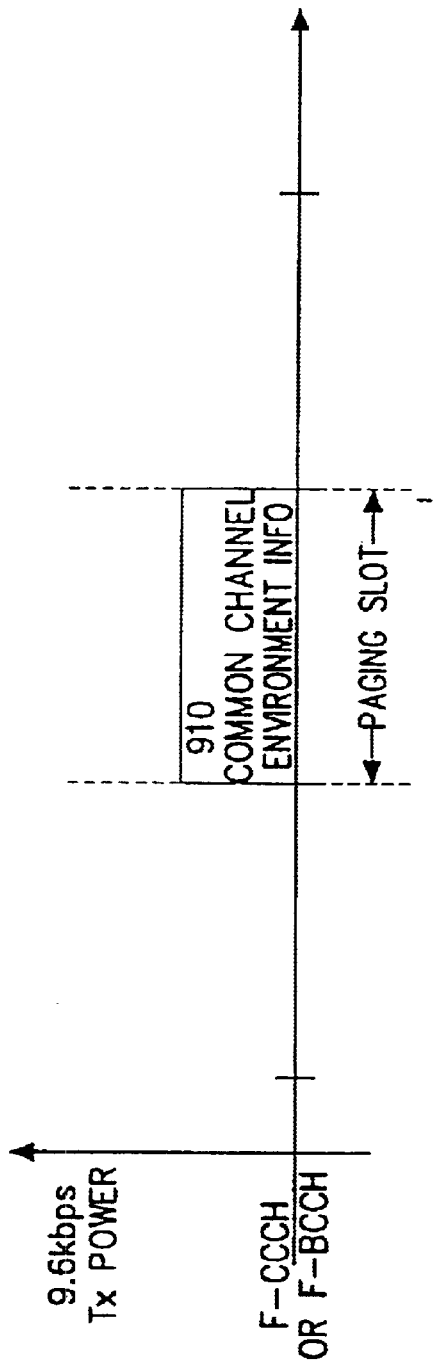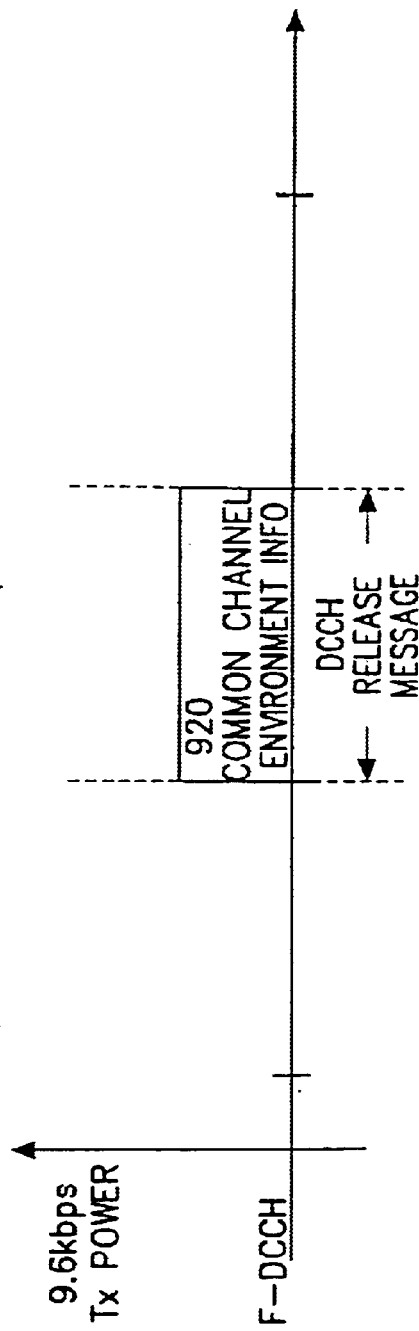

COMMON CHANNEL COMMUNICATION DEVICE AND METHOD SUPPORTING VARIOUS DATA RATES IN A MOBILE COMMUNICATION SYSTEM

PRIORITY

This application claims priority to an application entitled "Common Channel Communication Device and Method Supporting Various Data Rates in a Mobile Communication System" filed in the Korean Industrial Property Office on Sep. 14, 1998 and assigned Serial No. 98-38352, the contents of which are hereby incorporated by reference.

BACKGROUND OF THE INVENTION

1. Field of the Invention

The present invention relates generally to a communication device and method for a communication system, and in particular, to a device and method for managing a common channel having various data rates in a Code Division Multiple Access (CDMA) communication system.

2. Description of the Related Art

In a CDMA communication system, a channel which is used to transmit a link establishment request from a transmission side to a receiving side is called a common channel. A common channel transmits known signals such as preamble signals prior to message transmission.

In conventional mobile communication systems, a common channel has a fixed data rate of 9.6 Kbps or 4.8 Kbps and a fixed frame size (or length) of 20 ms. Seven channels using unique orthogonal codes (e.g., Walsh codes) are used for forward common channels, and for each forward common channel, five channels separated with unique long code masks are used as reverse common channels.

With regard to operation of the common channel, the channel to be used by a base station and a specific mobile station, out of the 7 forward common channels, is determined at the base station and the mobile station using a hash function. Once the forward common channel is determined, the base station always uses the determined channel when transmitting a message to that specific mobile station. The forward common channel operates in a slotted mode or a non-slotted mode. The slotted mode is used to reduce the power consumption of a mobile station; a corresponding slot for each mobile station is determined through the hash function. When the slot is determined, a mobile station receives a message from the base station through the determined slot.

The forward common channel has a data rate fixed at either 9.6 Kbps or 4.8 Kbps, and information concerning the data rate is transmitted through a common channel message. A mobile station receiving the data rate information constantly exchanges data at the fixed data rate. In general, the forward common channel uses 80 ms slots; a message can be transmitted over two slots.

In addition, for each forward common channel, 5 reverse common channels, at maximum, can be provided. The mobile station selects the access channel at random from the corresponding channels, and a base station decodes every available reverse common channel to receive a transmitted message.

The reverse common channel has a data rate fixed at 4.8 Kbps. For reverse common channel access, the slotted Aloha method is typically used. An important factor determining the slot size is a frame size. A factor determining the slot size includes PAM_SZ and MAX_CAP_SZ, wherein PAM_SZ designates the preamble size and MAX_CAP_SZ designates the message size. The above two factors both indicate the number of frames, and are transmitted to a mobile station through an access parameter message on a forward common channel.

An access slot is comprised of a preamble (PA) of size (1+PAM_SZ) and a message capsule of size (3+MAX_CAP_SZ).

The preamble is used for sync acquisition between a base station and a mobile station. In a mobile communication system, to minimize power consumption at the mobile station and to minimize interference, unnecessary transmission is suppressed and a transmission link is only established when the mobile station has a message or data to transmit. Therefore, before arrival of the message, the base station needs to perform sync acquisition for the message to be received from the mobile station. For effective sync acquisition, prior to sending intended message or data, a mobile station transmits preambles for a predetermined time and then transmits the intended message. The preamble is a signal previously scheduled (or designated) between the base station and the mobile station. In most mobile communication systems, a mobile station can select a transmission start time of the preamble from possible transmission start times on the basis of system time information, acquired from a signal transmitted from a base station after power-on. Alternatively, the transmission start time may be determined as a fixed parameter in the system. A receiver at the base station checks for the existence of a preamble at every possible preamble transmission time, presumed on the basis of the system time. Upon detection of a preamble, the base station performs sync acquisition and tracing procedures to receive the message transmission following the preamble.

The size of a message included in the access slot is limited by the MAX_CAP_SZ parameter. The system initially sets the MAX_CAP_SZ parameter on the basis of the largest mobile station message.

The conventional method has the following problems.

First, when an access is attempted and the data rate of the common channel is fixed at 9.6 Kbps or 4.8 Kbps, the interval between access slots is also fixed so that it is not possible to reduce the delay between access attempts. Therefore, when using the conventional common channel having a fixed data rate, mobile stations may conflict due to the constant slot interval. Furthermore, an increase in access delay may cause difficulties in data service, in the light of state transitions occurring during the data service.

Second, in the case where, during data service, the system transitions to a state where the dedicated channel has terminated, and there is a small amount of data to be transmitted at once, the resources consumed in the additional process of restarting data transmission are greater than the resources required for actual data transmission, thereby causing an ineffective use of the resources. That is, sometimes it is required to transmit data frames smaller than a predetermined size without reassignment of a dedicated channel, and it is difficult to transmit data frames of various sizes using the common channel with a fixed data rate.

SUMMARY OF THE INVENTION

It is, therefore, an object of the present invention to provide a device and method for realizing an access adaptively by varying the interval between access slots according to the data rate in a CDMA communication system.

It is another object of the present invention to provide a device and method for transmitting a data frame smaller than a predetermined size through a common channel according to the amount of data to be transmitted in a CDMA communication system.

It is further another object of the present invention to provide a device and method for reducing the limitation on the rate and size of data which can be transmitted over a common channel when a reverse access slot is reduced in size, to ensure effective use of resources and fast access in a CDMA communication system.

To achieve the above and other objects, there is provided a common channel communication method for a base station in a mobile communication system including common channels each supporting at least two data rates. The method comprises determining a data rate of a common channel available in a common channel service state and a frame length serviceable at the determined data rate, including information about the determined data rate and frame length on a specific forward common channel message before transmission; and upon receipt of an acknowledge message through a specific reverse common channel, setting a data rate and a frame length of the common channel to the determined values.

BRIEF DESCRIPTION OF THE DRAWINGS

The above and other objects, features and advantages of the present invention will become more apparent from the following detailed description when taken in conjunction with the accompanying drawings in which:

FIG. 9A is a diagram illustrating a broadcast message containing common channel environment information periodically transmitted over a forward common channel at a corresponding slot of each mobile station;

FIG. 9B is a diagram illustrating a message containing common channel environment information transmitted over a dedicated control channel during a state transition;

DETAILED DESCRIPTION OF THE PREFERRED EMBODIMENTS

A preferred embodiment of the present invention will be described herein below with reference to the accompanying drawings. In the following description, well-known functions or constructions are not described in detail since they would obscure the invention in unnecessary detail.

In an embodiment, a common channel is managed by two methods. In the first operating method, access environment information (i.e., frame size and data rate) of a common channel are transmitted to a mobile station; when the data rate of the common channel increases, the frame size is either reduced to decrease an access delay or increased to transmit a large amount of data. In the second operating method, access environment information is not previously transmitted to the mobile station, so the mobile station has to perform simultaneous management of incoming data rates and frame sizes.

The term "common channel" used here is not restricted to a common channel as defined in a conventional mobile communication system. In an embodiment of the present invention, forward common channels include a forward paging channel (F-PCH) and a forward common control channel (F-CCCH), and reverse common channels include a reverse access channel (R-ACH) and a reverse common control channel (R-CCCH). A description of the embodiments will be made on the assumption that the common channel is a reverse access channel (R-ACH).

With regard to the available data rate and associated frame size of the common channel in a CDMA communication system now under standardization, 20 ms, 10 ms and 5 ms frames all can be transmitted over the common channel at a data rate of 38.4 Kbps; 20 ms and 10 ms frames can be transmitted at a data rate of 19.2 Kbps; and only a 20 ms frame can be transmitted at a data rate of 9.6 Kbps. Table 1 below shows available data rates and associated frame sizes of the common channel.

TABLE 1

|  | 20 ms | 10 ms | 5 ms |
|---|---|---|---|
| 38.4 Kbps | O | O | O |
| 19.2 Kbps | O | O |  |
| 9.6 Kbps | O |  |  |

Reference will now be made to a slot structure for a reverse common channel according to variations in a data rate and a frame size.

Figure 1:
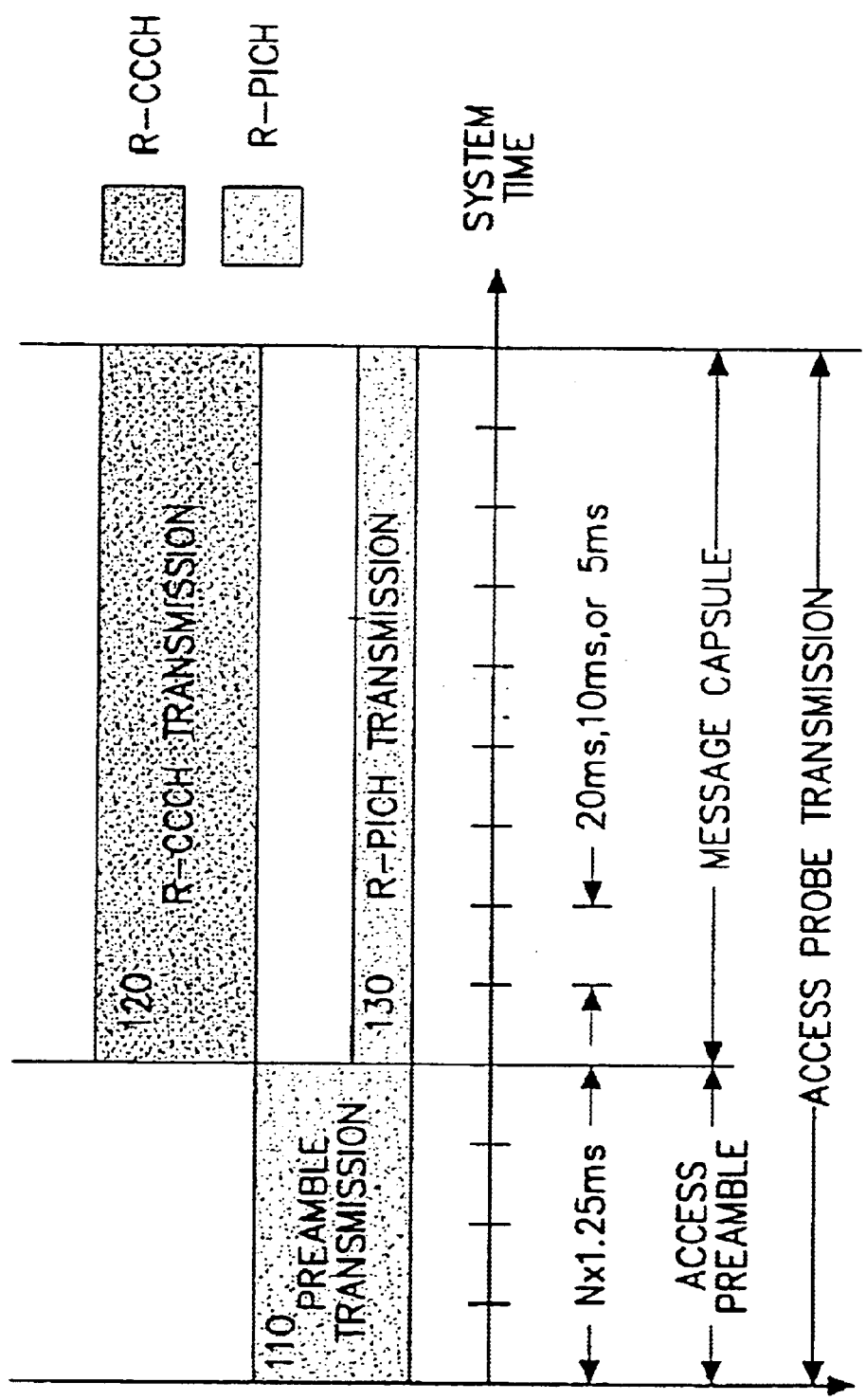
FIG. 1 is a diagram illustrating a common reverse access slot in a CDMA communication system.

FIG. 1 illustrates the reverse slot structure commonly used in a CDMA communication system. Referring to FIG. 1, prior to starting transmission of an access channel message 120, a preamble 110 is transmitted for a predetermined time and then a pilot channel message is transmitted with reduced transmission power as shown by 130. Here, the transmission period of the preamble 110 is assumed to be N*1.25 ms. The preamble 110 and a reverse pilot channel 130 can be generated by either the same sequence generator or separate sequence generators. The reverse pilot channel signal 130 is utilized for channel estimation and sync tracing for a reverse link, and may include forward pilot information. The reason that the preamble 110 is transmitted at a transmission power higher than that of a reverse pilot channel 130, is to facilitate preamble detection and sync acquisition at the base station. The message capsule 120 is the portion containing a message and data to be transmitted from a mobile station to a base station.

When mobile stations using the same long code simultaneously transmit messages through the reverse common channel, a message contention occurs on the channel, so that the messages to be transmitted may be lost. This method is called contention-based random access.

When message contention occurs on the reverse common channel, the mobile station re-attempts access of the reverse common channel. In this case, each mobile station transmits a message over the reverse common channel, using a selected long code. If contention occurs again, each mobile station detects occurrence of this contention in a little time and retransmits the data after a lapse of a predetermined time period. In addition, the mobile station attempts an access to a base station at an initially determined transmission power, and re-attempts an access at increased transmission power when an acknowledge signal is not received from the base station. Attempted access of the reverse access channel is repeated a predetermined number of times. When the access finally fails, the procedure is performed again from the beginning. Such message transmission through the reverse common channel is performed in a predetermined time unit (i.e., an access slot).

Access probe control factors include persistent delay (PD), sequence backoff (RS), probe backoff (RA) and acknowledge response timeout (TA). The persistent delay (PD) is the time period prior to the initial access attempt; the sequence backoff (RS) is the time period between access sequences; and the probe backoff (RA) is the time between access probes. The acknowledge response timeout is the expected time period from when a message is transmitted at one slot to when an acknowledge is received. An important factor affecting the above factors is an interval between access slots.

Figure 2:
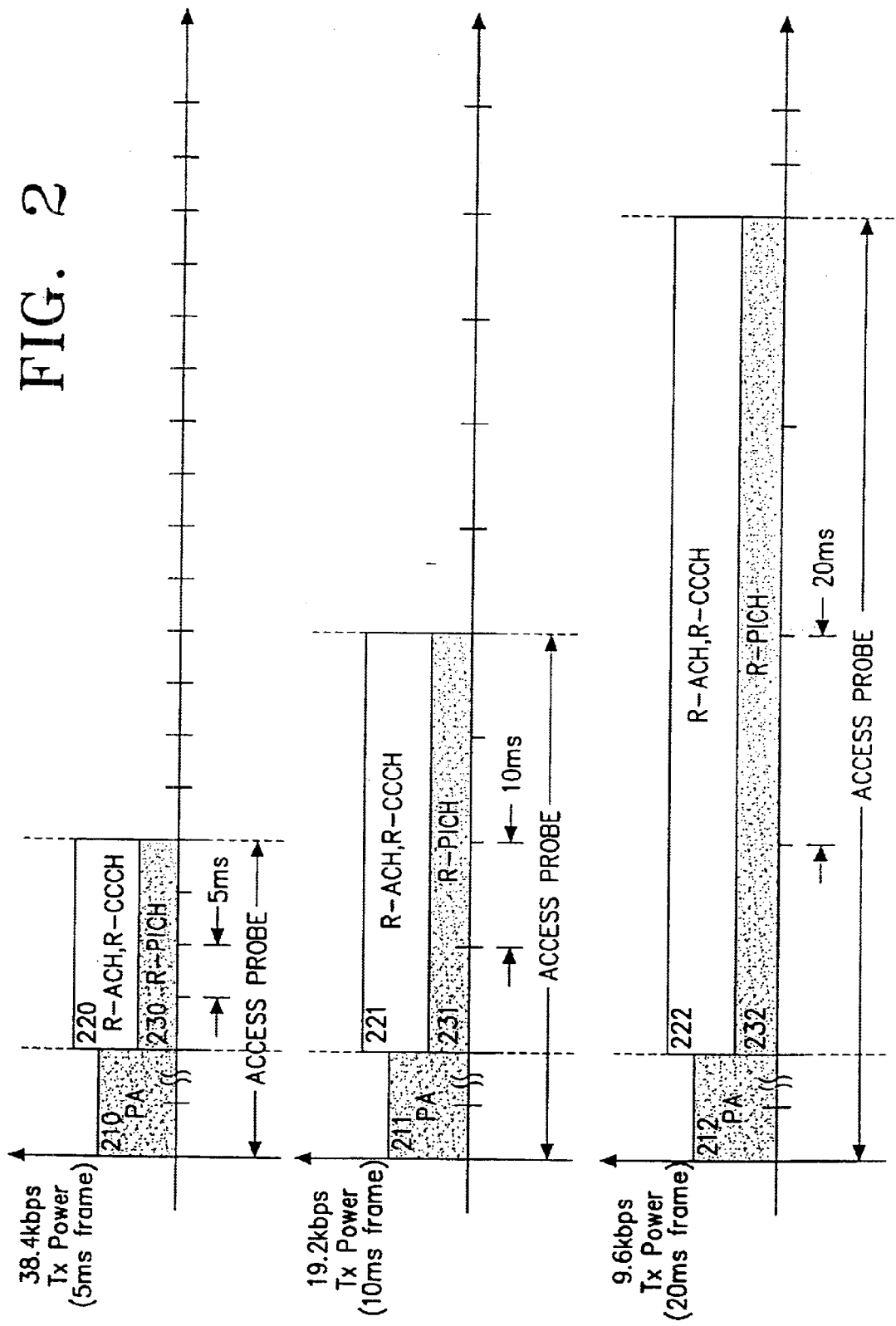
FIG. 2 is a diagram illustrating a reverse access slot for various frame sizes used in a CDMA communication system according to an embodiment of the present invention.

FIG. 2 illustrates a reverse access slot structure for various frame sizes to be used according to an embodiment of the present invention.

Referring to FIG. 2, when a 5 ms frame is used at a data rate of 38.4 Kbps, it transmits as much information as a 20 ms frame used at a data rate of 9.6 Kbps. The reverse access slot structure shown in FIG. 2 is identical to the conventional one in that it is comprised of a preamble 210 and a message capsule. However, when the permissible frame length becomes shorter, the access slot size is also reduced, causing a decrease in the access time interval of the system. Therefore, the frequency of simultaneous access probes is decreased and the probability of successful access are increased. Since the access interval control factors are determined on the basis of the access slot size, a decrease in size of the access slot causes a decrease in the access probe interval, thereby reducing access time and increasing the probability of successful access.

Figure 3:
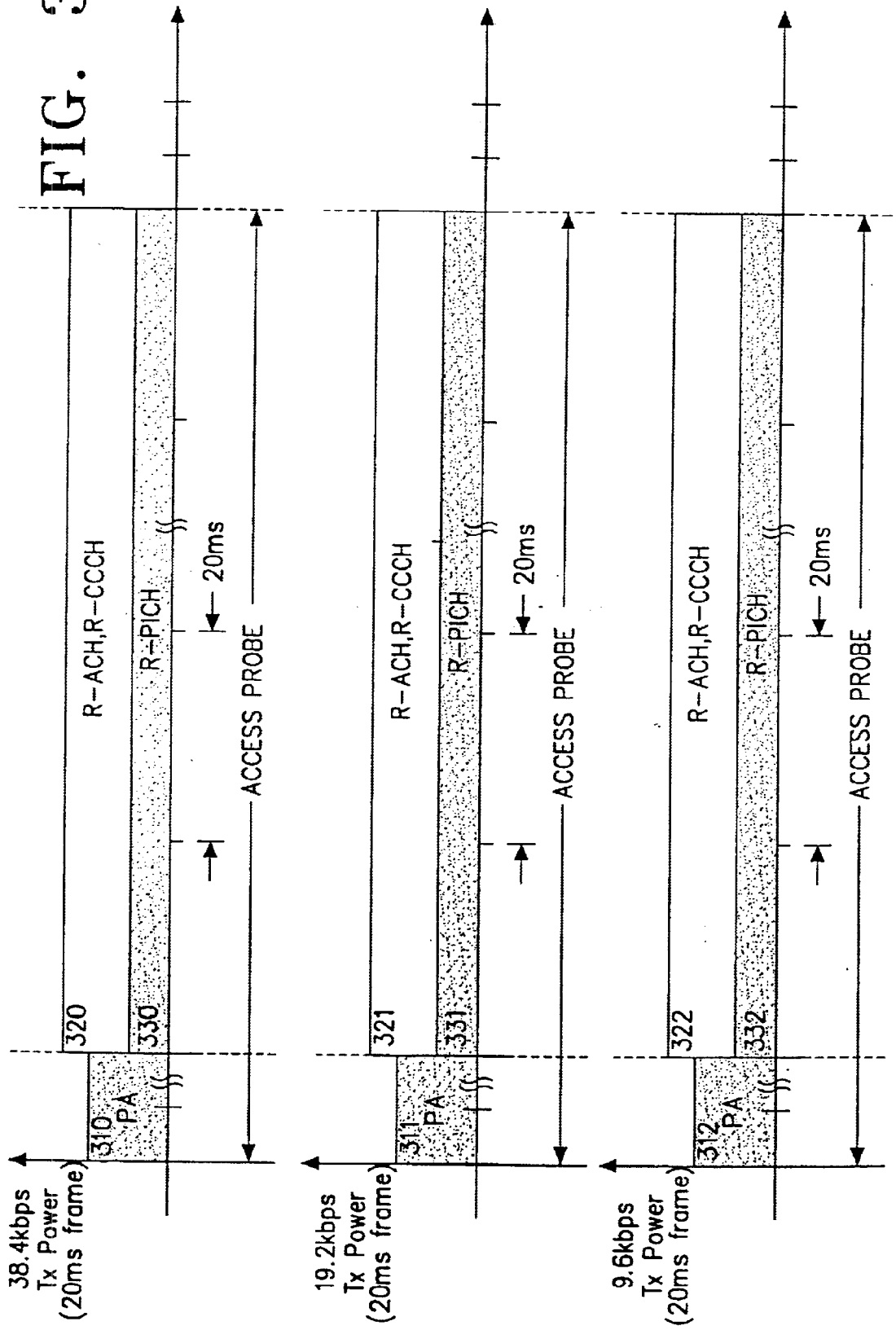
FIG. 3 is a diagram illustrating a reverse access slot having various data rates for a 20 ms frame in a CDMA communication system according to an embodiment of the present invention.

FIG. 3 illustrates a reverse access slot having various data rates for a 20 ms frame according to an embodiment of the present invention. When a 20 ms frame is used at a data rate of 38.4 Kbps while maintaining the same access slot size (as shown on the top of FIG. 3), the reverse access channel can transmit information 4 times as much as when a 20 ms frame is used at a data rate of 9.6 Kbps (as shown on the bottom of FIG. 3).

Figure 4:
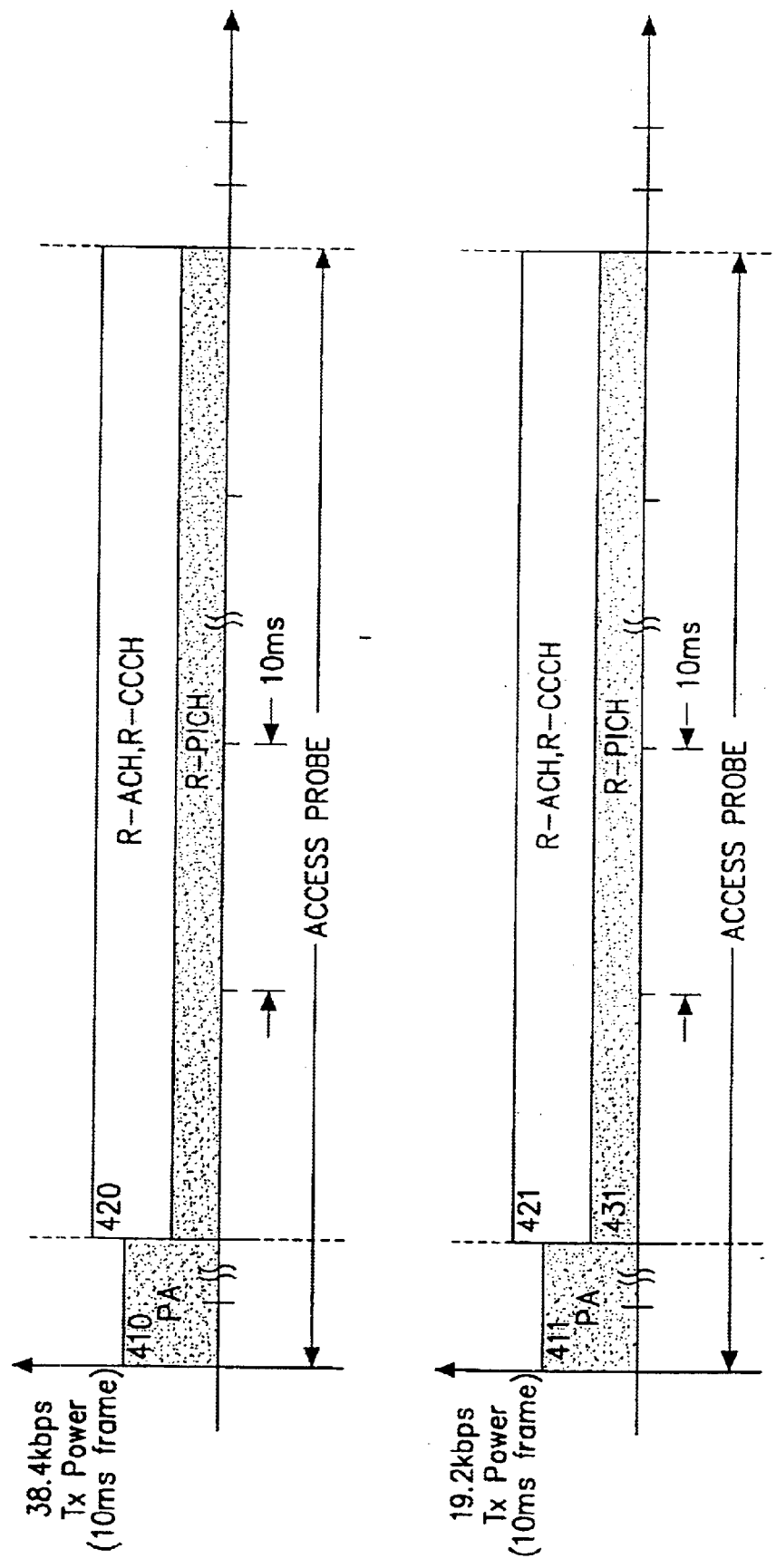
FIG. 4 is a diagram illustrating a reverse access slot having various data rates for a 10 ms frame in a CDMA communication system according to an embodiment of the present invention.

FIG. 4 illustrates a reverse access slot having various data rates for a 10 ms frame according to an embodiment of the present invention. In FIG. 4, a 10 ms frame is shown at the data rates of 38.4 Kbps and 19.2 Kbps.

In order to fully exploit the advantages of the various channel structures and frame sizes presented above, they should be combined in various ways. Table 2 shows available frame sizes according to data rates in a common channel.

TABLE 2

|  | 38.4 Kbps | 19.2 Kbps | 9.6 Kbps |
|---|---|---|---|
| Code CH Set 1 (5 ms Reference Slot) | O |  |  |
| Code CH Set 2 (10 ms Reference Slot) | O | O |  |
| Code CH Set 3 (20 ms Reference Slot) | O | O | O |

With regard to a first common channel operating method, the data rate used can be selected out of 38.4, 19.2 and 9.6 Kbps, and one of 5 ms, 10 ms and 20 ms frames can be used according to the data rate, as shown in Table 2. In addition, code channel sets can be either separately managed or simultaneously managed for forward and reverse code channels.

When the common channels are independently managed according to slot lengths as stated above, a mobile station requiring a prompt access can reduce access delay by attempting an access through a reverse code channel which uses an access slot based on a 5 ms frame, thereby decreasing access delay and increasing the probability of a successful access.

The above reverse channel structure can be realized in various methods.

Figure 17:
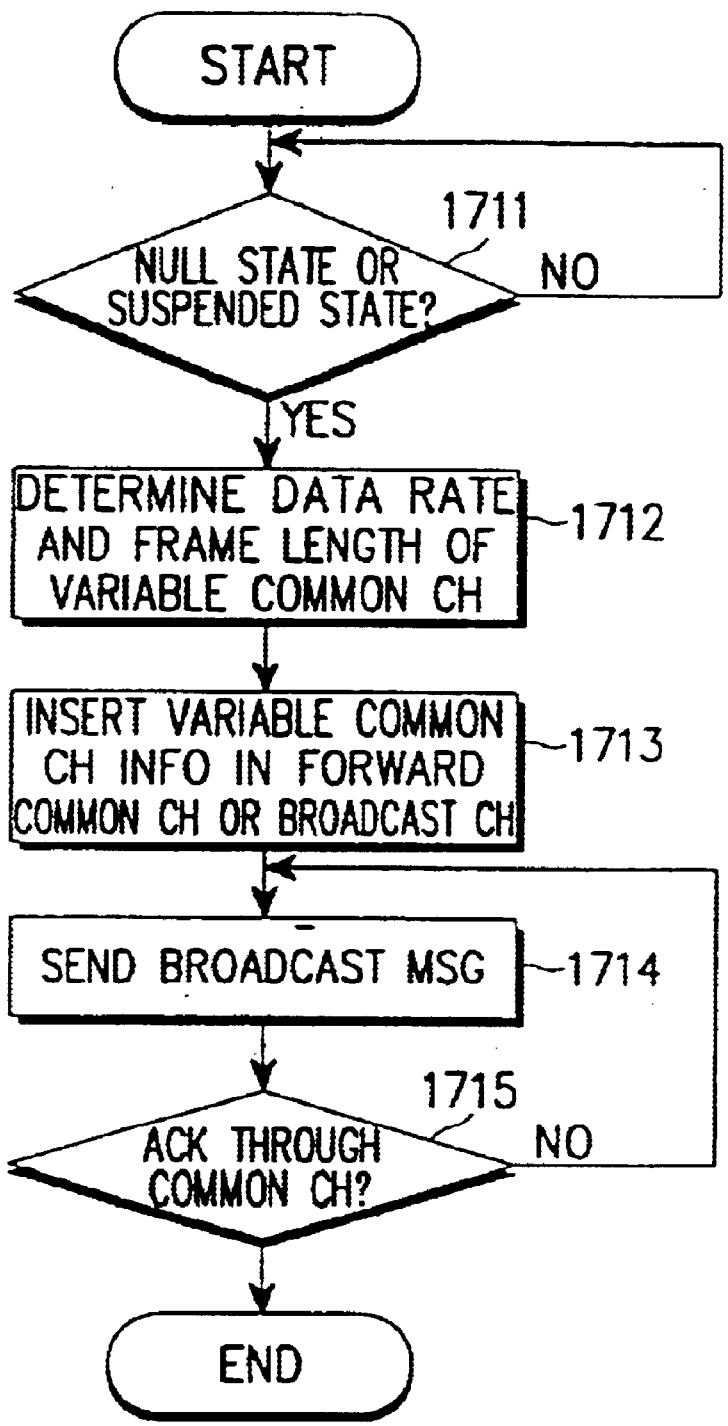
FIG. 17 is a flow chart illustrating a procedure in which a base station acquires information about an available common channel in a suspended state or a null state and transmits the information over a forward common channel or a broadcast channel, and a mobile station then acquires the information, according to an embodiment of the present invention.

First, as shown in FIG. 9A, the channel set to be used to attempt a mobile station access is periodically transmitted by the base station through a forward common channel configuration message 910 which includes the frame size and data rate of each channel. A procedure for transmitting the message 910 is shown in FIG. 17.

FIG. 9A illustrates a broadcast message of common channel information transmitted periodically over a forward common channel. FIG. 17 illustrates the procedure by which a base station acquires information about an available common channel in a suspended state or a null state, transmits the information over a forward common channel or a broadcast channel, and a mobile station then acquires the information, according to an embodiment of the present invention. The common channel information to be transmitted to the corresponding mobile station is transmitted through a paging slot corresponding to each mobile station in a forward common channel or a broadcast channel, and each mobile station acquires common channel information to use through the common channel configuration message at the corresponding slot.

A possible scenario will be described with reference to FIG. 17. A base station detects a null state or a suspended state in step 1711. Thereafter, in step 1712, the base station determines the data rate and frame length of an available common channel in order to control them to be suitable for a resource condition in a cell, user class, or QoS (Quality of Service) parameter. Thereafter, in step 1713, available common channel constituent information is added to a message on a forward common channel or a broadcast channel. In step 1714, the message containing information about available channel sets is sent to each mobile station through the paging channel of the mobile station. Upon receipt of an acknowledge signal from a reverse common channel in step 1715, the base station ends the procedure.

Therefore, the base station transmits available common channel constituent information through a forward common channel or a broadcast channel. Upon receipt of the broadcast information, the mobile station attempts transmission of the next reverse common channel message through the code channel designated by the base station, completing the step 1715. A forward common channel used during initial cell entrance, uses a fixed frame size. For example, a method can be used, which acquires system information through a forward common channel using a 20 ms frame and then instructs use of an appropriate common channel.

The above common channel operating method will be referred to as the first operating method.

Figure 16:
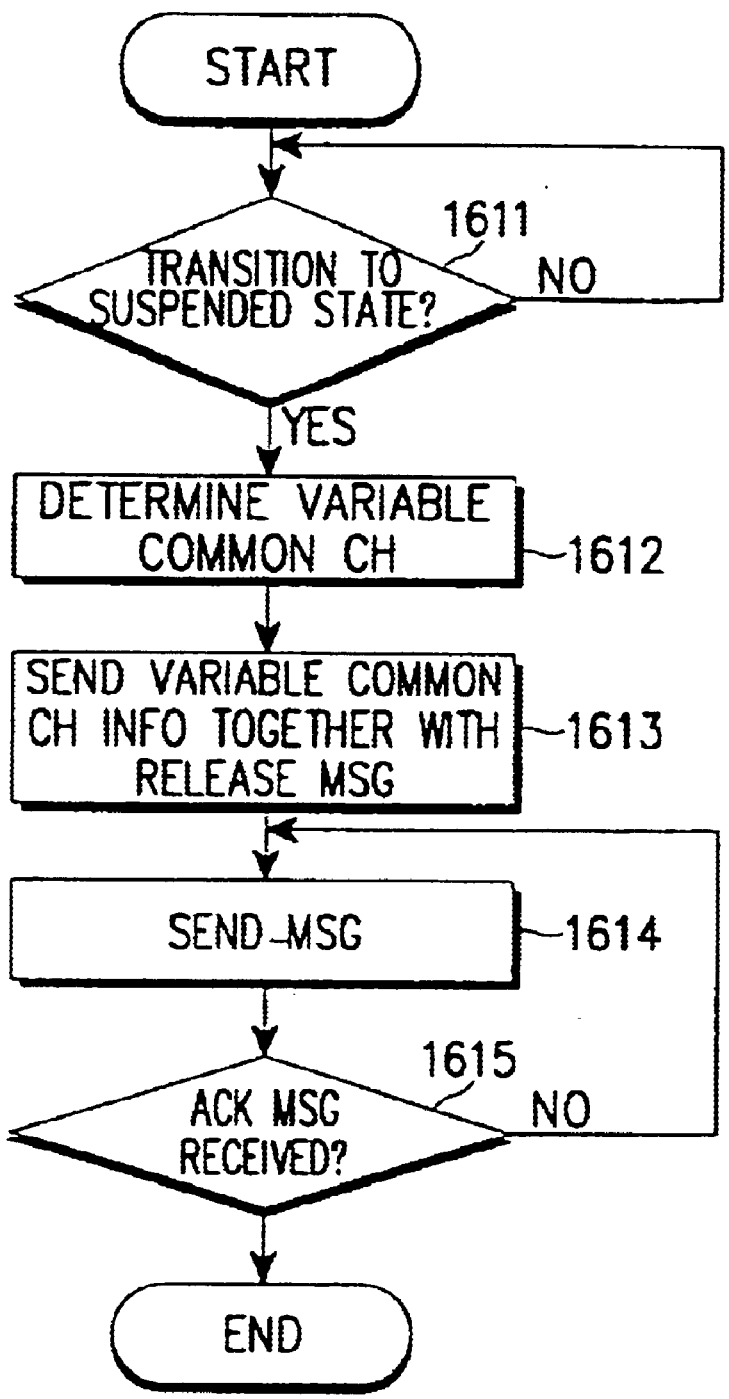
FIG. 16 is a flow chart illustrating a procedure in which a base station acquires information about an available common channel during a transition to a suspended state and transmits the information over a dedicated control channel, and a mobile station then acquires the information, according to an embodiment of the present invention.

Second, as shown in FIG. 9B, a data service state notices a code channel set for the common channel, to be used later, through a message transitioning from a control hold state to a suspended state, and this procedure is shown in FIG. 16.

FIG. 9B illustrates a message of common channel information transmitted over a dedicated control channel during a state transition in a CDMA communication system. FIG. 16 illustrates a procedure in which a base station acquires information about an available common channel during a transition to a suspended state and transmits the information over a dedicated control channel, and a mobile station then acquires the information, according to an embodiment of the present invention.

Referring to FIG. 16, a base station detects a transition from a control hold state to a suspended state in step 1611. Thereafter, in step 1612, the base station determines an available common channel. When the available common channel is determined, the base station transmits a broadcast message containing information about the available common channel together with a channel release message, in steps 1613 and 1614. Thereafter, when an acknowledge message is received in step 1615, the base station ends the procedure.

Figure 14:
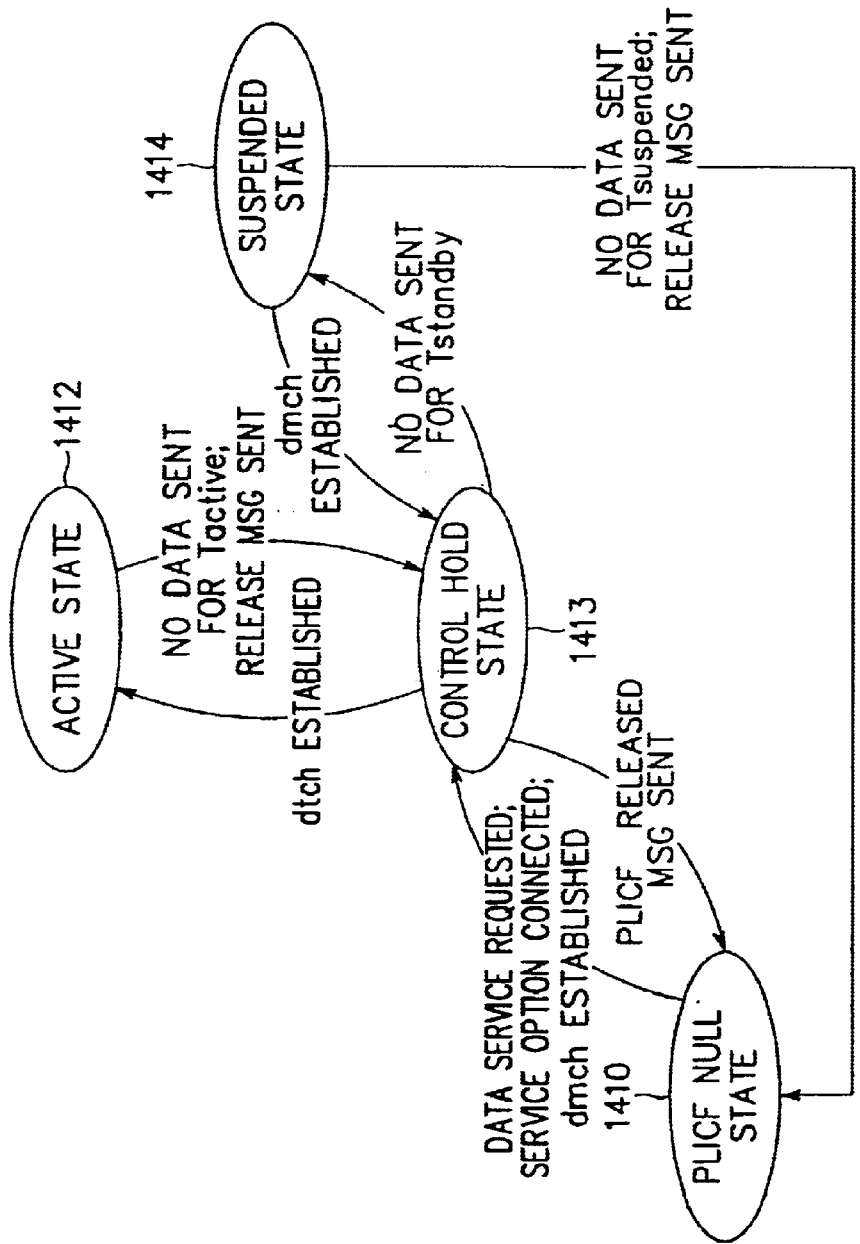
FIG. 14 is a state transition diagram for a packet data service.
Figure 15:
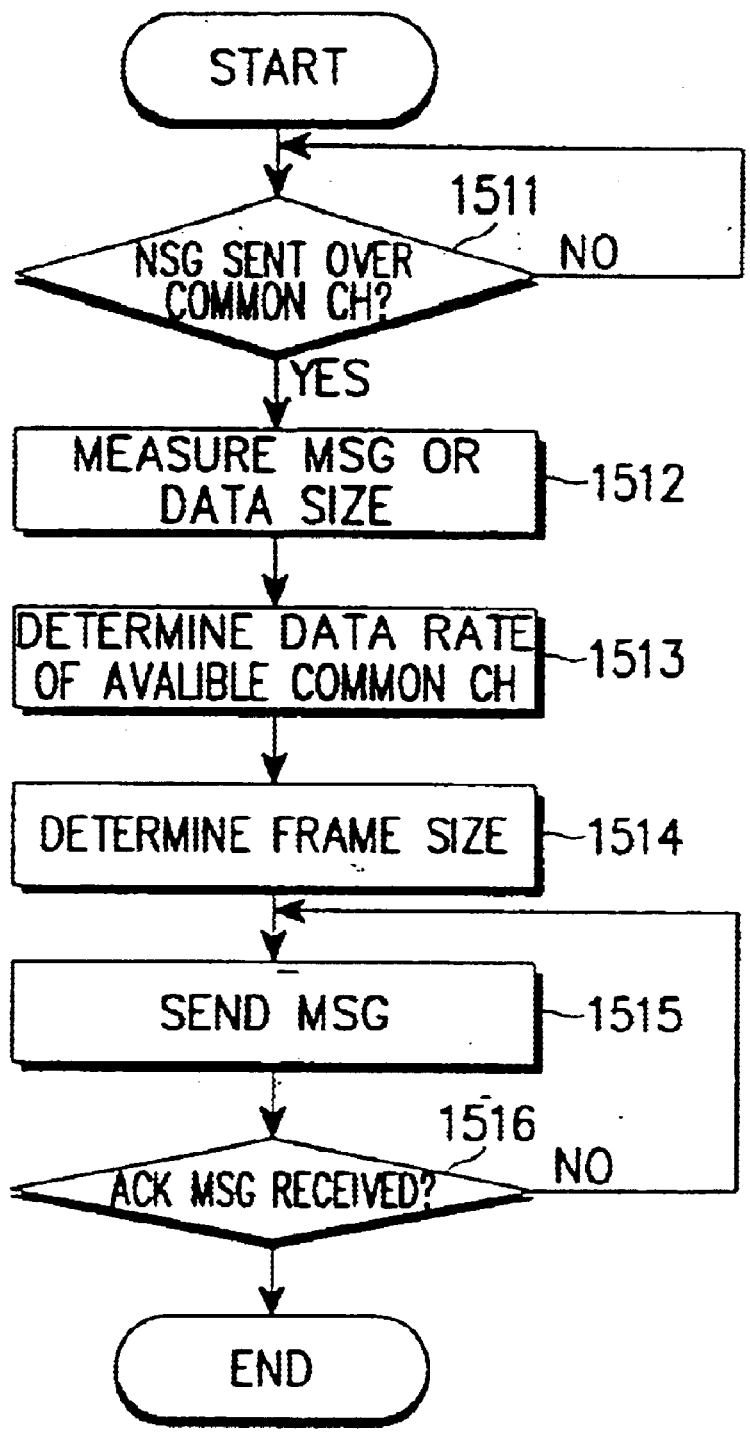
FIG. 15 is a flow chart illustrating a procedure for acquiring an available common channel during data or message transmission through a common channel having variable or various data rates according to an embodiment of the present invention.

When a mobile communication system provides a packet data service, the system transitions between states as shown in FIG. 14, for effective use of resources. When a transition occurs from the control hold state to the suspended state, every dedicated control channel is released. Thereafter, to restart data transmission, a message for re-assigning the dedicated channel is exchanged over a common channel. Information about the common channel to be used at this time is added to the dedicated control channel release message and then sent to a mobile station. Alternatively, when a high speed common channel is not used according to a power condition of the mobile station, the mobile station can inform the base station of the data rate of the available channel through an acknowledge message.

The above common channel operating method will be referred to as the second operating method.

Third, every set of the common channels shown in Table 2 is simultaneously used. In this case, a process for determining a forward common channel and determining a paging slot should always be performed for all of the 3 code channel sets during entrance to a cell. At this point, determination of the common channel to be used, is made depending on a characteristic of the resource condition or service type of the mobile station and the base station, or the size of data to be transmitted at one slot.

The above common channel operating method will be referred to as the third operating method.

In general, the size of a message which can be transmitted over a common channel at one access slot is appointed during cell entrance, and a unique number is assigned to data or a message in the unit of size which can be transmitted at one access slot. A parameter used at this time is based on the number of frames. When several frame sizes are available as in an embodiment of the present invention, the size of the data or message, which can be transmitted with a variable size, is diversified. However, there may be a case where the maximum quantity of transmission data, appointed on the assumption of high speed transmission, cannot be satisfied. Therefore, when a mobile station uses the common channel at a low rate in a state where the reverse common channel cannot be used as a high data rate, a function for re-assigning unique numbers according to the transmittable slot sizes should be added to the functions of the medium access control layer.

Now, a description will be made with regard to hardware structures according to the operating methods stated above. The description will be made with reference to the first and second operating methods.

Figure 5:
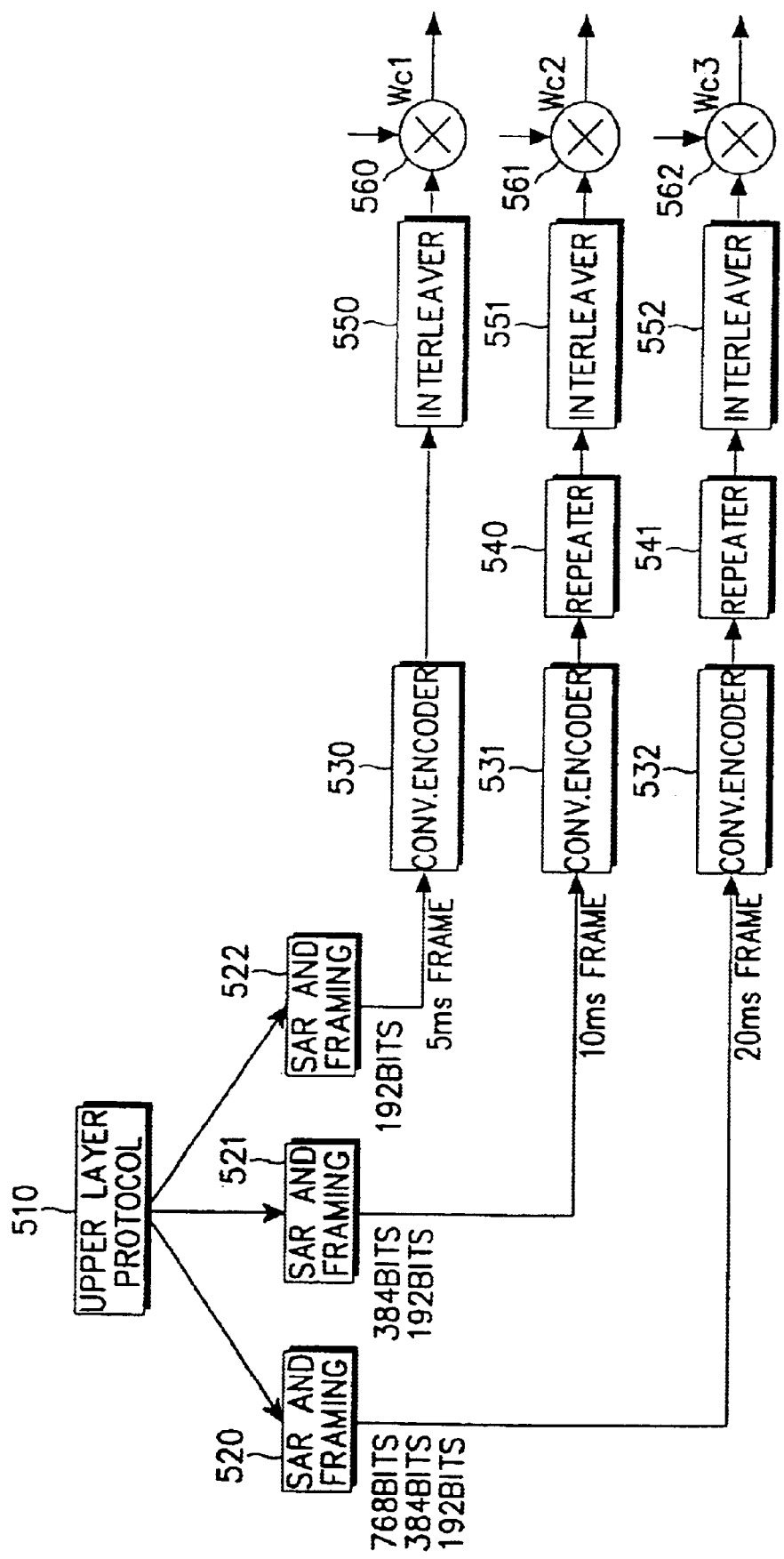
FIG. 5 is a block diagram of a base station transmitter using the first and second operating methods in a CDMA communication system according to an embodiment of the present invention.
Figure 6:
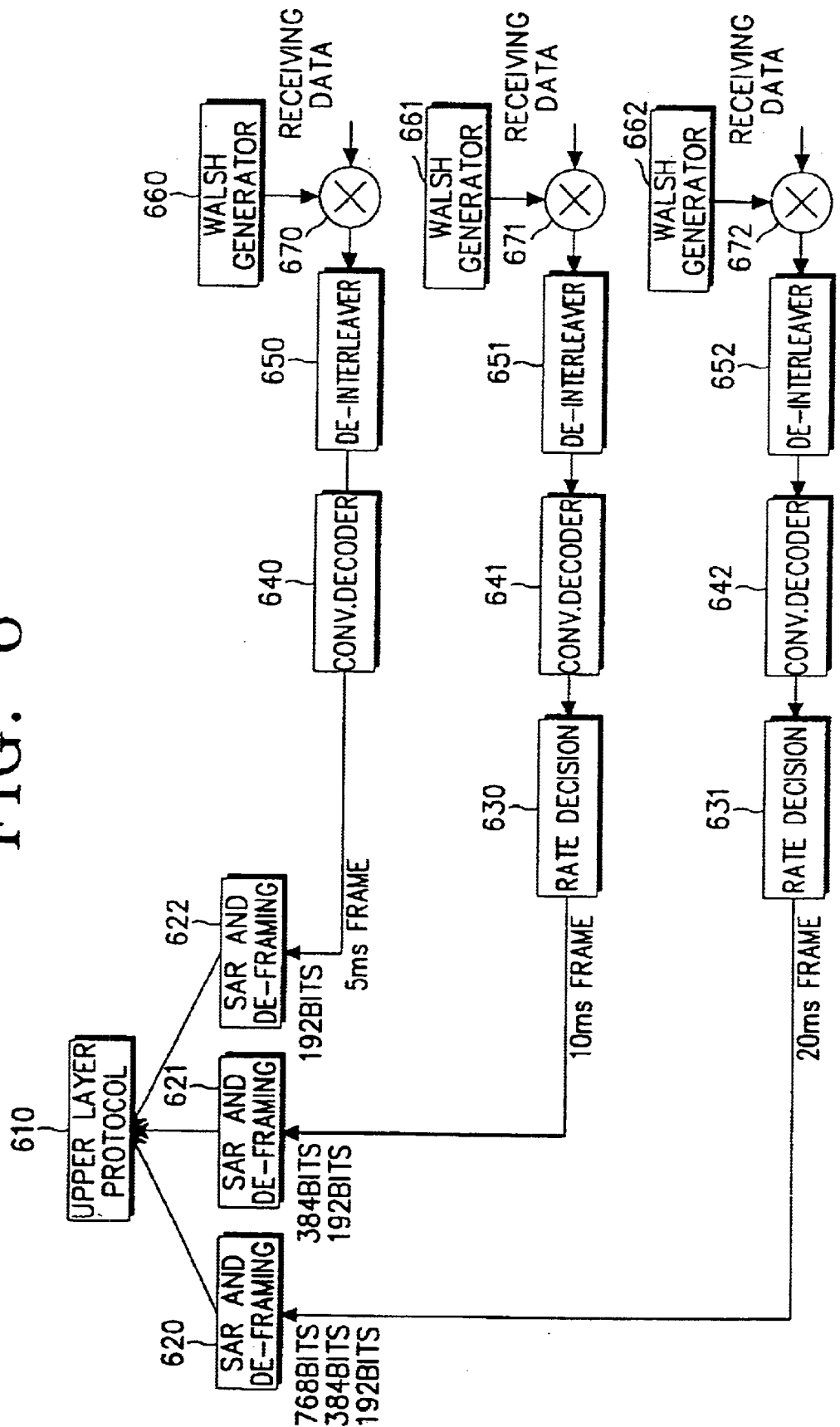
FIG. 6 is a block diagram of a mobile station receiver corresponding to the base station transmitter, using the first and second operating methods in a CDMA communication system according to an embodiment of the present invention.
Figure 7:
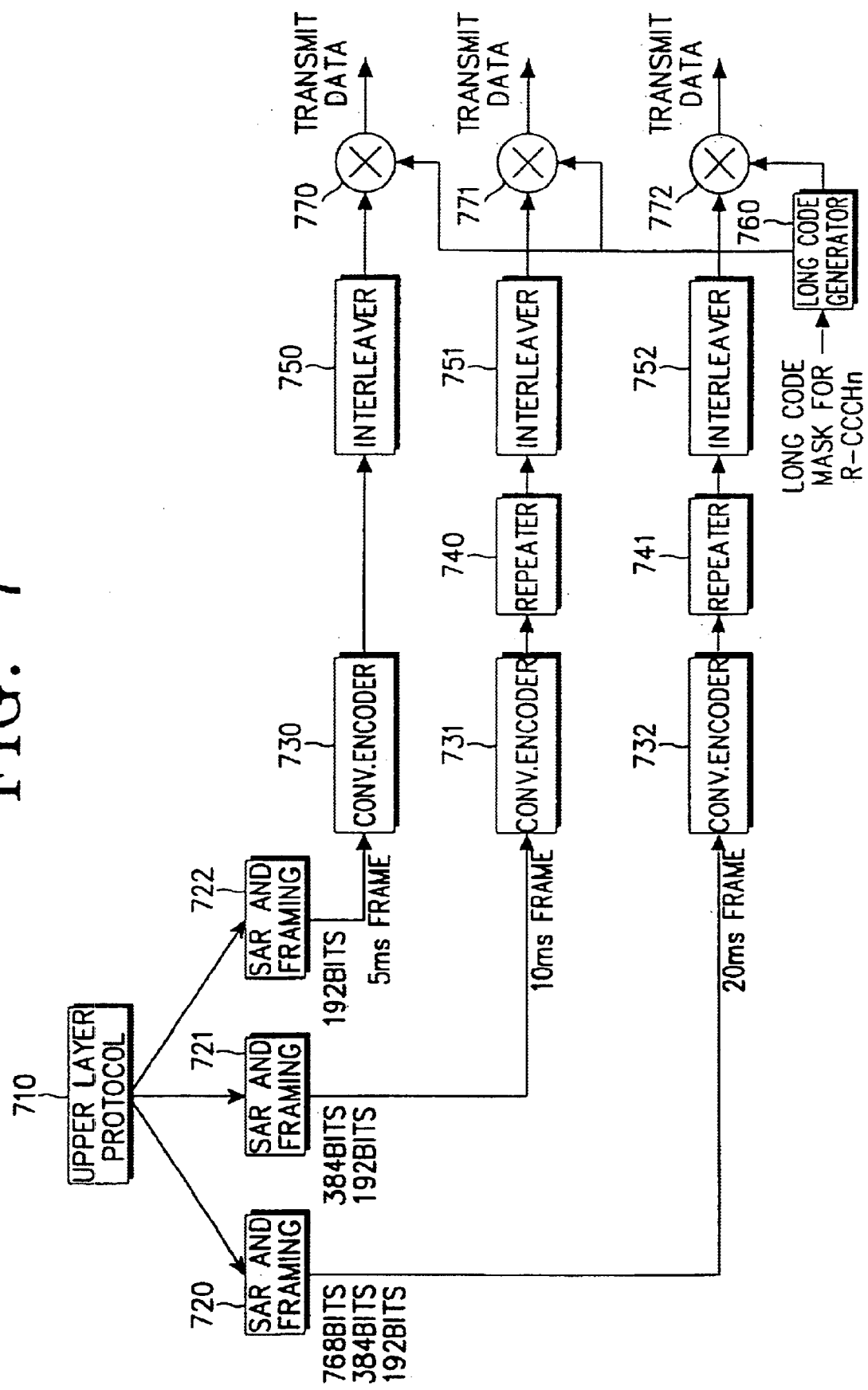
FIG. 7 is a block diagram of a mobile station transmitter using the first and second operating methods in a CDMA communication system according to an embodiment of the present invention.
Figure 8:
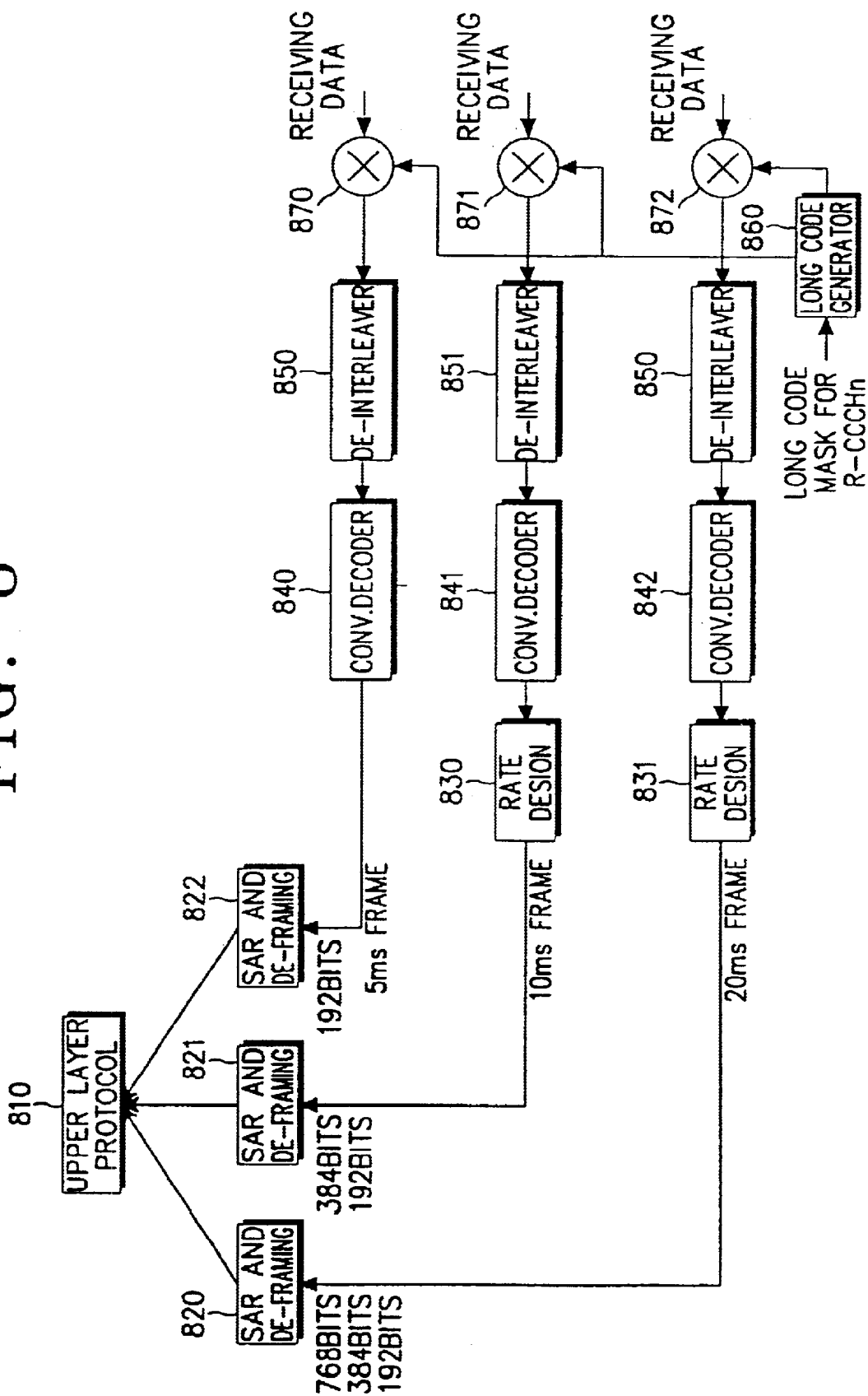
FIG. 8 is a block diagram of a base station receiver corresponding to the mobile station transmitter, using the first and second operating methods in a CDMA communication system according to an embodiment of the present invention.

FIGS. 5 to 8 illustrate transceivers of a base station and a mobile station according to the above operating methods. More specifically, FIG. 5 is a block diagram illustrating a base station transmitter. In the first and second operating methods, the mobile station is previously notified of the operating environments of a common channel through a forward common channel. FIG. 6 is a block diagram illustrating a mobile station receiver corresponding to the base station transmitter. FIG. 7 is a block diagram illustrating a mobile station transmitter, and FIG. 8 is a block diagram illustrating a base station receiver corresponding to the mobile station transmitter.

FIG. 5 illustrates a base station transmitter according to an embodiment of the present invention, where the elements unconcerned with this embodiment of the present invention are not shown for the sake of simplicity.

Referring to FIG. 5, an upper layer protocol part (or controller) 510 refers to an entire upper module of the physical layer. Upon receipt of a message or data transferred from the upper layer protocol part 510 according to a transmission environment, SAR (Segmentation And Reassembly) and framing parts 520, 521 and 522 segment the message or data to be suitable for a frame of the physical layer. When the slots are fixed according to the respective channels in the above devices, the SAR and framing part 522 outputs a 5 ms frame and provides it to an encoder 530; the SAR and framing part 521 outputs a 10 ms frame and provides it to an encoder 531; and the SAR and framing part 520 outputs a 20 ms frame and provides it to an encoder 532. Here, a channel for transmitting the 5 ms frame can have a data rate of 38.4 Kbps, a channel for transmitting the 10 ms frame can have data rates of 38.4 Kbps and 19.2 Kbps, and a channel for transmitting the 20 ms frame can have data rates of 38.4 Kbps, 19.2 Kbps and 9.6 Kbps. In the above devices, to reduce access delay, a smaller frame and a higher data rate are used, and to transmit large amount of data, a larger frame is used. The encoders 530, 531 and 532 are general channel encoders for detecting and correcting an error on a communication channel. Since the above operating methods can use various data rates for one channel, repeaters 540 and 541 perform repetition so as to match data of a low rate to a size of a predetermined physical frame. Interleavers 550, 551 and 552 interleave received coded data to randomize burst errors. Mixers 560, 561 and 562 multiply outputs of the associated interleavers 550, 551 and 552 by Walsh codes Wc1, Wc2 and Wc3, respectively, to generate orthogonally spread signals. The orthogonally spread signals are multiplied by a PN sequence for spreading and then converted to RF (Radio Frequency) signals for transmission. The data rate of each channel is controlled to be suitable for the cell condition of each base station, and controlled, by a control part, to be suitable for a data rate of each module. The determined data rate and frame size are simultaneously transmitted to a mobile station.

FIG. 6 illustrates a schematic block diagram of a mobile station receiver according to an embodiment of the present invention, wherein the elements unconcerned with this embodiment are not shown for the sake of simplicity.

Referring to FIG. 6, signals received at a mobile station are input to mixers 670, 671 and 672 after PN despreading at an RF receiving stage (not shown). The mixers 670, 671 and 672 multiply the PN despread signals by associated outputs of Walsh code generators 660, 661, and 662, which are identical to those used in the base station, to extract only the signals transmitted to the mobile station. The signals output from the mixers 670, 671 and 672 are deinterleaved by deinterleavers 650, 651 and 652, respectively. Decoders 640, 641 and 642 are channel decoders for decoding the deinterleaved signals. Rate decision parts 630 and 631 determine data rates using the deinterleaved signals, and a 5 ms frame receiver does not require a rate decision part because the data rate for the 5 ms frame is fixed at 38.4 Kbps. Therefore, the rate decision part 640 should be able to distinguish the data rates of 38.4 Kbps and 19.6 Kbps, and the rate decision part 641 should be able to distinguish the data rates of 38.4 Kbps, 19.6 Kbps and 9.6 Kbps.

However, since the forward common channel operates in a slotted mode to reduce power consumption of a mobile station, whether to use a short slot can be determined according to a condition of the mobile station or a service type.

FIG. 7 illustrates a mobile station transmitter according to an embodiment of the present invention, wherein the elements unconcerned with this embodiment are not shown for the sake of simplicity.

Referring to FIG. 7, an upper layer protocol part (or controller) 710 refers to an entire upper module of the physical layer. Upon receipt of a message or data transferred from the upper layer protocol part 710 according to a transmission environment, SAR and framing parts 720, 721 and 722 segment the message or data to be suitable for a frame of the physical layer. A channel for transmitting the 5 ms frame can have a data rate of 38.4 Kbps, a channel for transmitting the 10 ms frame can have data rates of 38.4 Kbps and 19.2 Kbps, and a channel for transmitting the 20 ms frame can have data rates of 38.4 Kbps, 19.2 Kbps and 9.6 Kbps. The SAR and framing part 722 outputs a 5 ms frame and provides it to an encoder 730; the SAR and framing part 721 outputs a 10 ms frame and provides it to an encoder 731; and the SAR and framing part 720 outputs a 20 ms frame and provides it to an encoder 732.

The encoders 730, 731 and 732 are general channel encoders for detecting and correcting an error on a communication channel. Repeaters 740 and 741 perform repetition so as to match data of a low rate to the size of a physical frame. Interleavers 750, 751 and 752 interleave coded data to randomize burst errors. Mixers 770, 771 and 772 multiply transmission signals output from the associated interleavers 750, 751 and 752 by long codes for the respective code channels, respectively, and output the signals to an RF stage (not shown). A data rate and a frame size of the reverse common channel are transmitted by a base station as a common channel configuration message over a forward common channel.

FIG. 8 illustrates a schematic block diagram of a base station receiver according to an embodiment of the present invention, wherein the elements unconcerned with this embodiment are not shown for the sake of simplicity.

Referring to FIG. 8, signals received at a base station are input to mixers 870, 871 and 872 through an RF receiving stage (not shown). The mixers 870, 871 and 872 multiply the received signals by associated outputs of a long code generator 860, which are identical to those used in the mobile station, to extract only the signals transmitted to the base station. The signals output from the mixers 870, 871 and 872 are deinterleaved by deinterleavers 850, 851 and 852, respectively. Decoders 840, 841 and 842 are channel decoders for decoding the deinterleaved signals. Rate decision parts 830 and 831 determine data rates using the deinterleaved signals, and a 5 ms frame receiver does not require a rate decision part because the data rate for the 5 ms frame is fixed at 38.4 Kbps. Therefore, the rate decision part 840 should be able to distinguish the data rates of 38.4 Kbps and 19.6 Kbps, and the rate decision part 841 should be able to distinguish the data rates of 38.4 Kbps, 19.6 Kbps and 9.6 Kbps.

The first operating method and the reverse channel structure can be realized in various methods.

First, in FIG. 9A, the data rate and frame size of a common channel to be used to attempt an access is periodically transmitted through a forward common channel configuration message 910. At this point, each mobile station receives the message through its corresponding paging slot. A base station adds the forward common channel configuration message 910 to a forward common channel or a forward broadcast channel in the null state or the suspended state, so as to be suitable for the resource condition in the cell, the user class or the QoS parameter, and notifies a data rate and an access slot size of a common channel to be used through each broadcast message. A mobile station attempts the next transmission of a reverse common channel using the code channel transmitted from the base station. The forward common channel used during initial cell entrance uses a fixed data rate and the fixed size of an available slot.

Second, as shown in FIG. 9B, a message containing a data rate and a frame size for the common channel, to be used later, is transmitted when the data service state is transitioning from a control hold state to a suspended state. When a mobile communication system provides a packet data service, the system transitions between states for effective use of the resources. When a transition occurs from the control hold state to the suspended state, every dedicated control channel is released. Thereafter, to restart data transmission, a message for re-assigning the dedicated channel is exchanged over a common channel. Information about the common channel to be used at this time is added to a dedicated control channel release message and then sent to a mobile station. Alternatively, when a high speed common channel is not used according to a power condition of the mobile station, the mobile station can transmit the data rate of the available channel to the base station through an acknowledge message.

FIGS. 10 to 13 illustrate cases where the access slot size is fixed to one value according to data rates. When a channel is managed in this method, repeaters are not required in the transmitter and rate decision parts in the receiver. FIGS. 10 to 13 show the transceivers of a mobile station and a base station with the repeaters and rate decision parts removed. The transceivers operate in the same manner as in FIGS. 5 to 8, except for the repeaters and rate decision parts.

Figure 10:
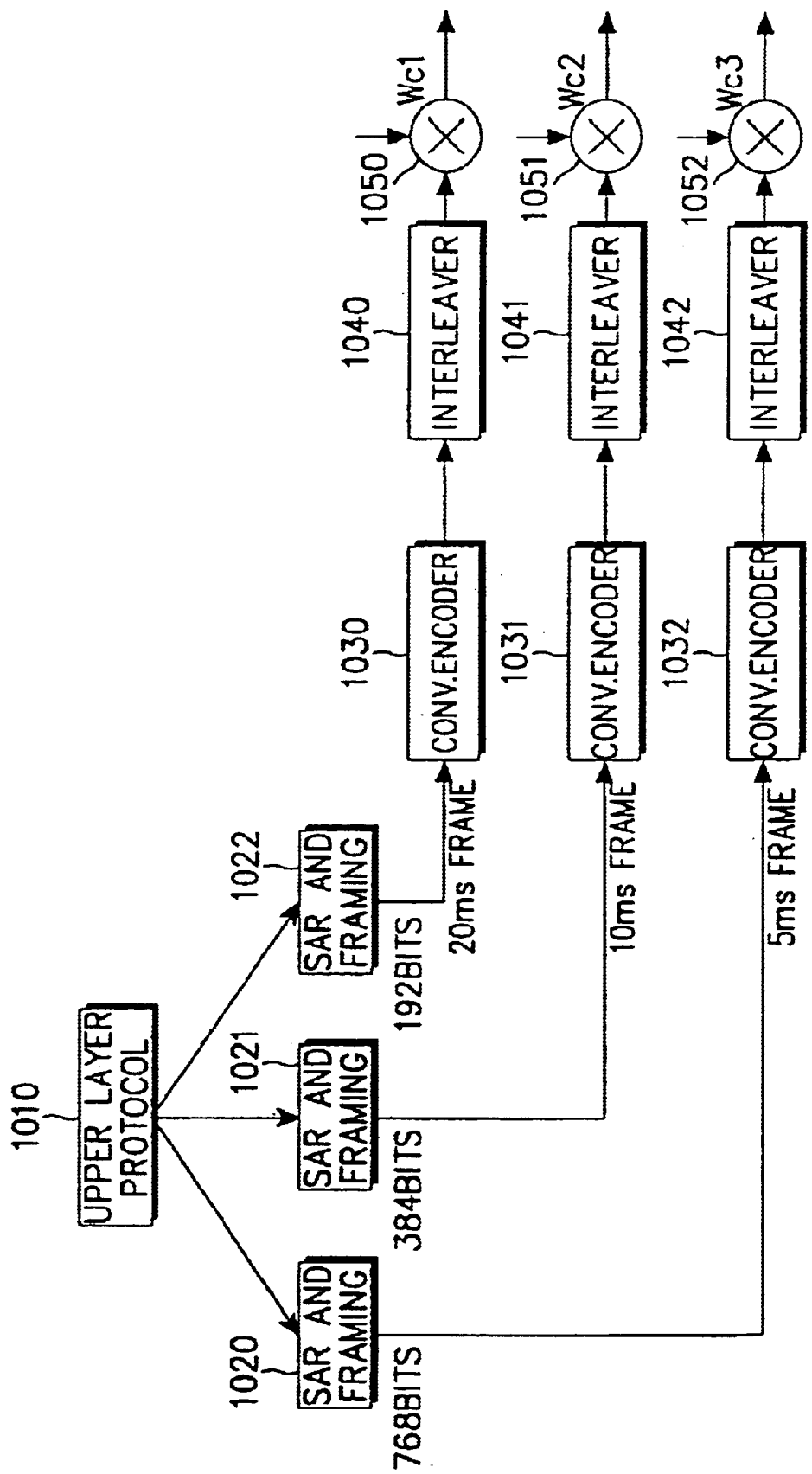
FIG. 10 is a block diagram of a base station transmitter which determines and uses a frame size and a data rate in the first and second operating methods in a CDMA communication system according to an embodiment of the present invention.

FIG. 10 is a block diagram illustrating a base station transmitter when frame sizes are fixed according to data rates of the channels when the first and second operating methods are used, wherein the elements unconcerned with this embodiment of the present invention are not shown for simplicity.

Referring to FIG. 10, an upper layer protocol part (or controller) 1010 refers to an entire upper module of the physical layer. Upon receipt of a message or data transferred from the upper layer protocol part 1010 according to the transmission environment, SAR and framing parts 1020, 1021 and 1022 segment the message or data to be suitable for a frame of the physical layer. When the sizes of the frames generated from the SAR and framing parts 1020, 1021 and 1022 are fixed according to data rates, the SAR and framing part 1022 outputs a 5 ms frame and provides it to an encoder 1030; the SAR and framing part 1021 outputs a 10 ms frame and provides it to an encoder 1031; and the SAR and framing part 1020 outputs a 20 ms frame and provides it to an encoder 1032. Here, the 5 ms frame is transmitted only at 38.4 Kbps, the 10 ms frame is transmitted only at 19.6 Kbps, and the 20 ms frame is transmitted only at 9.6 Kbps.

When the frame size is fixed at 20 ms regardless of the data rate as stated above, the frames are transferred to the encoders 1032, 1031 and 1030 and can be transmitted at 38.4 Kbps, 19.2 Kbps and 9.6 Kbps, respectively. When the frame size is fixed to 10 ms, the frames are transferred to the encoders 1032 and 1031 and can be transmitted at 38.4 Kbps and 19.2 Kbps, respectively. Further, when frame size is fixed to 5 ms, the frames are transferred to the encoder 1032 and can be transmitted at 38.4 Kbps.

The encoders 1030, 1031 and 1032 are general channel encoders for detecting and correcting an error on a communication channel. The other structures are identical to those in FIG. 5, except that a different set of the orthogonal codes are multiplied according to the data rates.

Figure 11:
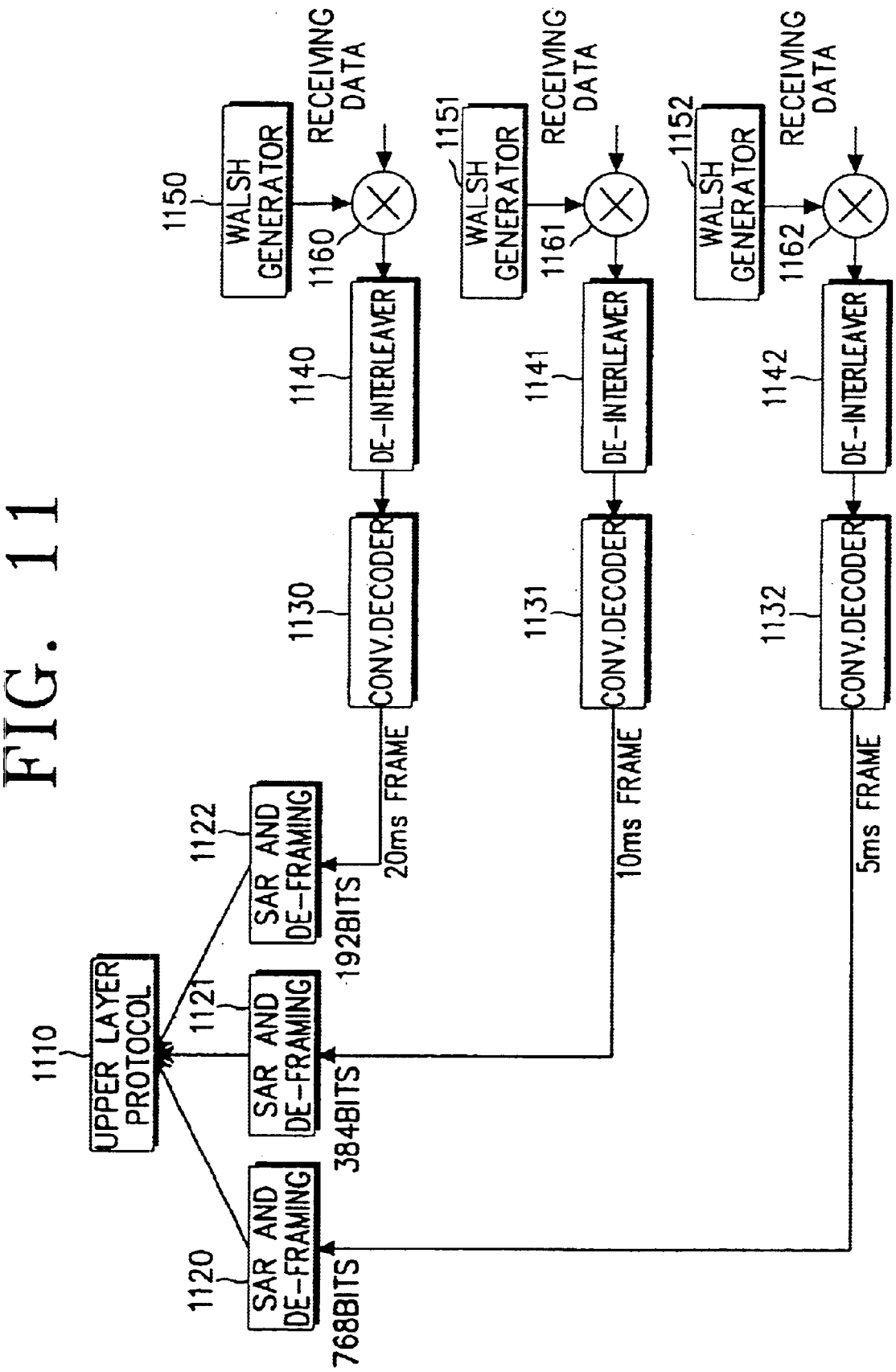
FIG. 11 is a block diagram of a mobile station receiver corresponding to the base station transmitter, which determines a frame size and a data rate in the first and second operating methods in a CDMA communication system according to an embodiment of the present invention.

FIG. 11 is a block diagram of a mobile station receiver which receives a signal transmitted from the base station transmitter of FIG. 10 according to an embodiment of the present invention, wherein the elements unconcerned with this embodiment are not shown for the sake of simplicity.

Referring to FIG. 11, signals received at a mobile station are input to mixers 1160, 1161 and 1162 through an RF receiving stage (not shown). The mixers 1160, 1161 and 1162 multiply the received signals by associated outputs of Walsh code generators 1150, 1151, and 1152, which are identical to those used in the base station, to extract only the signals transmitted to the mobile station. The signals output from the mixers 1160, 1161 and 1162 are deinterleaved by deinterleavers 1140, 1141 and 1142, respectively. Since the data rates were determined according to the channels, rate decision parts are not required after decoders 1130, 1131, and 1132.

Since the forward common channel operates in a slotted mode to reduce the power consumption of mobile stations, whether to use a short slot can be determined according to a condition of a mobile station or a service type.

Figure 12:
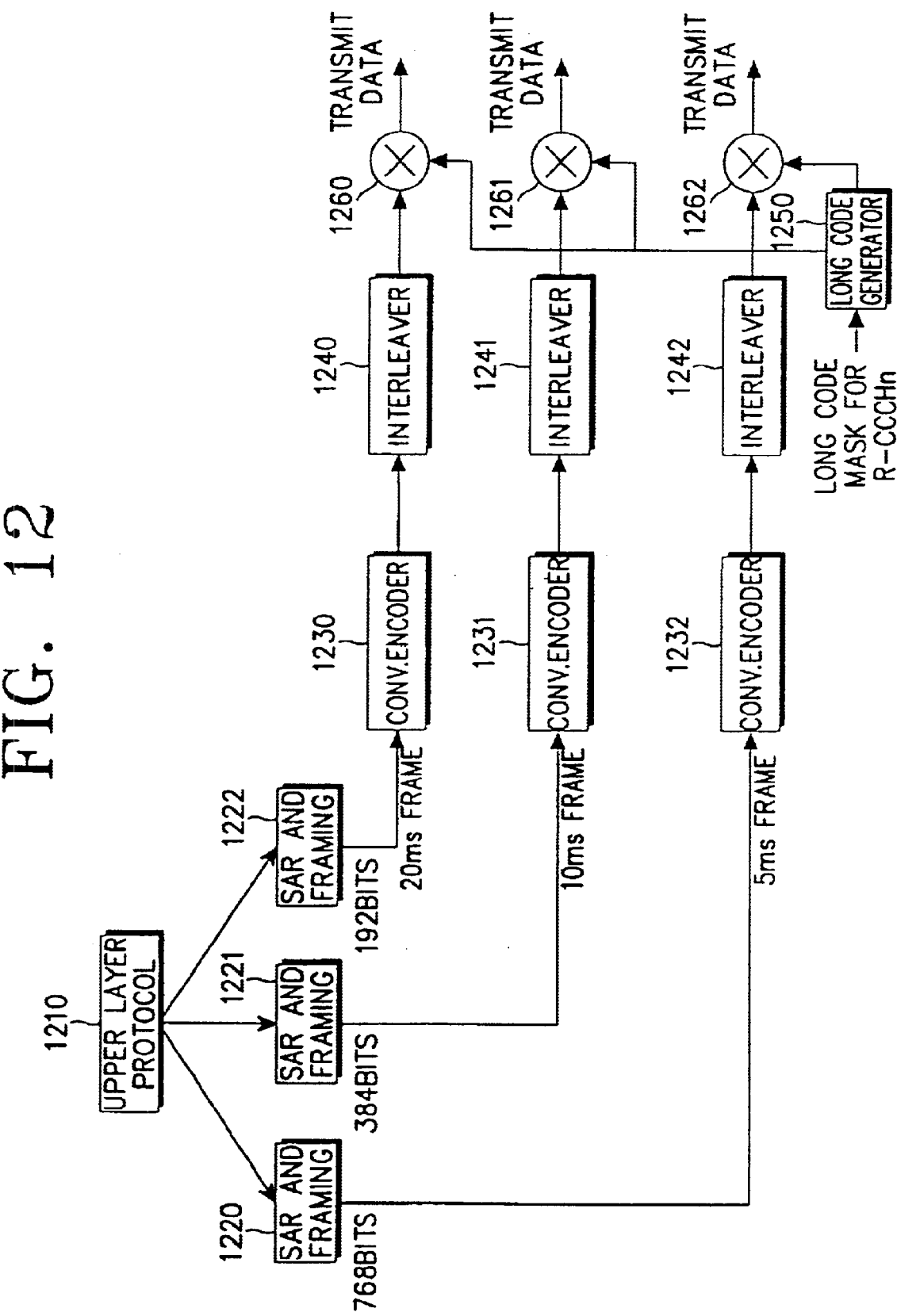
FIG. 12 is a block diagram of a mobile station transmitter which determines and uses a frame size and a data rate in the first and second operating methods in a CDMA communication system according to an embodiment of the present invention.

FIG. 12 illustrates a mobile station transmitter which fixes frame sizes according to data rates of the channels, wherein the elements unconcerned with this embodiment of the present invention are not shown for the sake of simplicity.

Referring to FIG. 12, an upper layer protocol part (or controller) 1210 refers to an entire upper module of the physical layer. Upon receipt of a message or data transferred from the upper layer protocol part 1210 according to a transmission environment, SAR and framing parts 1220, 1221 and 1222 segment the message or data to be suitable for a frame of the physical layer. The other structures are identical to those in FIG. 10, except that long codes are used in place of the orthogonal codes.

Figure 13:
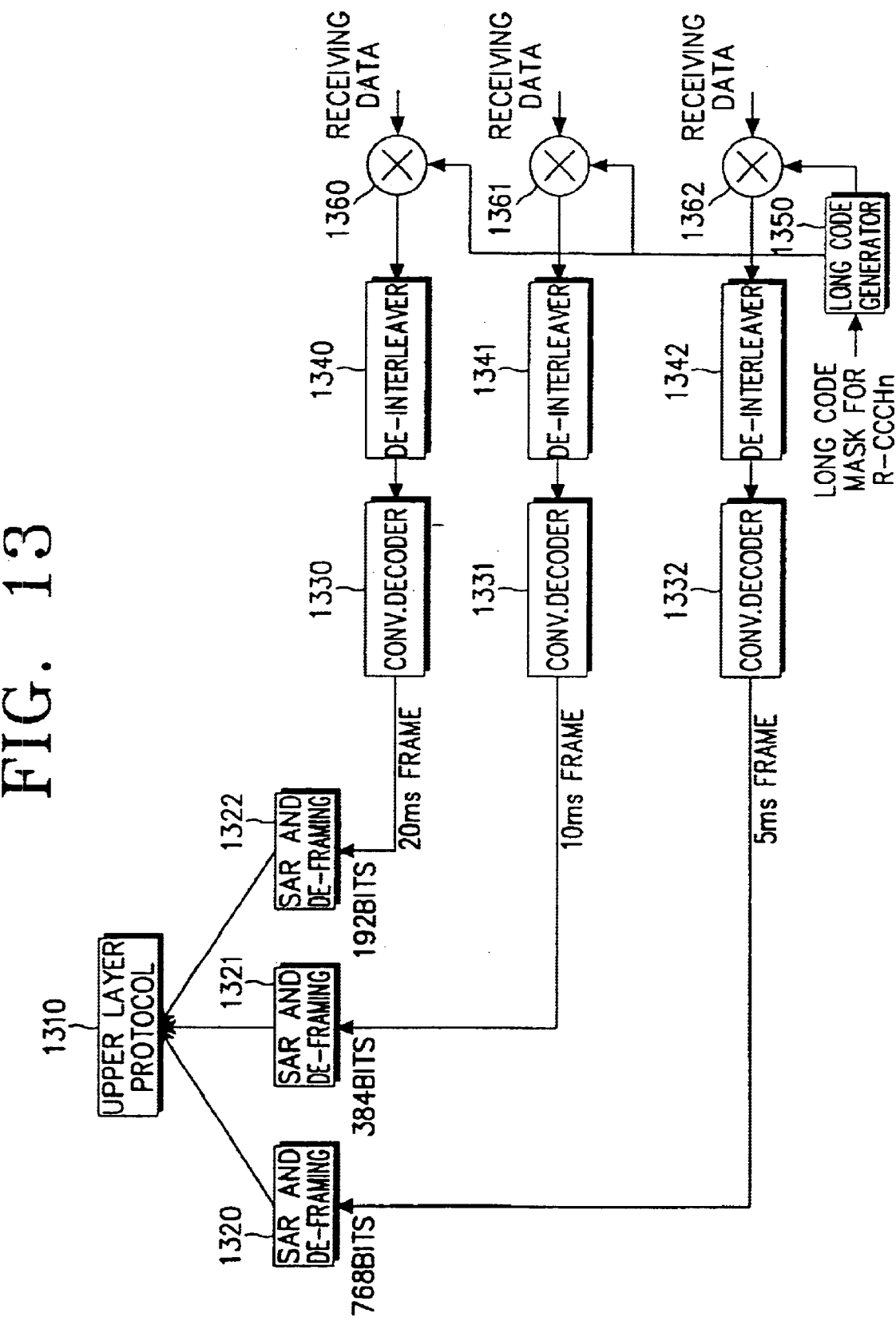
FIG. 13 is a block diagram of a base station receiver corresponding to the mobile station transmitter, which determines a frame size and a data rate in the first and second operating methods in a CDMA communication system according to an embodiment of the present invention.

FIG. 13 illustrates a base station receiver which receives a signal transmitted from the mobile station transmitter of FIG. 12 according to an embodiment of the present invention, wherein the elements unconcerned with this embodiment are not shown for the sake of simplicity.

Referring to FIG. 13, signals received at a base station are input to mixers 1360, 1361 and 1362 through an RF receiving stage (not shown). The mixers 1360, 1361 and 1362 multiply the received signals by associated outputs of a long code generator 1350, which are identical to those used in the mobile station, to extract only the signals transmitted to the base station. The other structures are identical to those in FIG. 11.

As described above, this novel method decreases access delay using a common channel supporting various data rates and frame sizes resulting in an increase in the probability of a successful access. In addition, it is possible to transmit data or a message having various frame sizes in one access slot.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A common channel communication method for a base station in a mobile communication system including common channels each supporting at least two data rates, comprising the steps of:

(a) determining a data rate of a common channel available in a common channel service state and a frame length serviceable at the determined data rate;

(b) including information about the determined data rate and frame length in a specific forward common channel message; and (c) upon receipt of an acknowledge message through a specific reverse common channel, setting a data rate and a frame length of the common channel to the determined values.

2. The common channel communication method as claimed in claim 1, wherein the frame length is determined as 20 ms for a data rate of 9.6 Kbps, in step (a).

3. The common channel communication method as claimed in claim 1, wherein the frame length is determined as 20 ms or 10 ms for a data rate of 19.2 Kbps, in step (a).

4. The common channel communication method as claimed in claim 1, wherein the frame length is determined as 20 ms, 10 ms or 5 ms for a data rate of 38.4 Kbps, in step (a).

5. The common channel communication method as claimed in claim 1, wherein the common channel service state is a suspended state.

6. The common channel communication method as claimed in claim 1, wherein the common channel service state is a null state.

7. The common channel communication method as claimed in claim 1, wherein the data rate and the frame length of the common channel are determined according to a common channel service state in a present base station.

8. The common channel communication method as claimed in claim 1, wherein the data rate and the frame length of the common channel are determined according to a user class.

9. The common channel communication method as claimed in claim 1, wherein the data rate and the frame length of the common channel are determined according to a quality of service (QoS) parameter.

10. The common channel communication method as claimed in claim 1, wherein the common channel supporting at least two data rates is a reverse access channel.

11. The common channel communication method as claimed in claim 1, wherein the specific forward common channel is a broadcast channel.

12. A common channel communication method for a mobile station in a mobile communication system including common channels each supporting at least two data rates, comprising the steps of:

receiving data rate and frame length information included in a message on a specific forward common channel in a common channel service state;

generating an acknowledge message including information about the received data rate and frame length;

transmitting the generated acknowledge message; and setting a data rate and a frame length of a common channel to the received data rate and frame length.

13. A common channel communication device for a base station in a mobile communication system, comprising:

a controller for determining a data rate of a common channel available in a common channel service state and a frame length serviceable at the determined data rate;

a forward broadcast channel transmitter for transmitting information about the determined data rate and frame length in a broadcast channel message and transmitting the broadcast channel message to a mobile station; and a common channel transmitter supporting at least two data rates, for setting a data rate and a frame length of the common channel to the determined values to communicate a message.

14. A common channel communication device for a mobile station in a mobile communication system, comprising:

a forward broadcast channel receiver for receiving data rate and frame length information included in a message on a specific forward common channel in a common channel service state; and a common channel transmitter supporting at least two data rates, for setting a data rate and a frame length of a common channel according to the received data rate and frame length information to communicate a message.

* * * * *